(12) United States Patent
Qin

(10) Patent No.: US 9,048,734 B2
(45) Date of Patent: Jun. 2, 2015

(54) NEGATIVE CURRENT PROTECTION SYSTEM FOR LOW SIDE SWITCHING CONVERTER FET

(71) Applicant: Analog Devices Technology, Hamilton (BM)

(72) Inventor: Song Qin, Shanghai (CN)

(73) Assignee: Analog Devices Global (BM)

( * ) Notice: Subject to any disclaimer, the term of this patent is extended or adjusted under 35 U.S.C. 154(b) by 159 days.

(21) Appl. No.: 13/782,223

(22) Filed: Mar. 1, 2013

(65) Prior Publication Data

US 2014/0247031 A1 Sep. 4, 2014

(51) Int. Cl.
G05F 1/00 (2006.01)
H02M 1/32 (2007.01)
H02M 3/158 (2006.01)

(52) U.S. Cl.
CPC .............. *H02M 1/32* (2013.01); *H02M 3/1588* (2013.01); *Y02B 70/1466* (2013.01)

(58) Field of Classification Search
USPC .................. 323/222–225, 271–277, 282–285
See application file for complete search history.

(56) References Cited

U.S. PATENT DOCUMENTS

| | | | | |
|---|---|---|---|---|
| 4,928,200 A * | 5/1990 | Redl et al. | ........................ | 361/94 |
| 5,414,341 A * | 5/1995 | Brown | .......................... | 323/268 |
| 5,481,178 A * | 1/1996 | Wilcox et al. | ................. | 323/287 |
| 5,847,554 A * | 12/1998 | Wilcox et al. | ................. | 323/282 |
| 7,233,131 B2 * | 6/2007 | Lin et al. | ........................ | 323/268 |
| 7,298,122 B2 * | 11/2007 | Bernacchia et al. | .......... | 323/282 |
| 7,498,791 B2 * | 3/2009 | Chen | .............................. | 323/284 |
| 7,592,788 B2 * | 9/2009 | Bartolo et al. | ................. | 323/276 |
| 7,595,615 B2 * | 9/2009 | Li et al. | .......................... | 323/277 |
| 7,919,952 B1 * | 4/2011 | Fahrenbruch | ................. | 323/222 |
| 7,986,135 B2 * | 7/2011 | Kenly et al. | ................... | 323/285 |
| 8,077,490 B1 * | 12/2011 | Prodic et al. | .................... | 363/65 |
| 8,120,336 B2 * | 2/2012 | Mehas et al. | ................... | 323/224 |
| 8,779,744 B2 * | 7/2014 | Kahn | ............................. | 323/285 |
| 2004/0032242 A1 * | 2/2004 | Corva et al. | .................... | 323/284 |
| 2006/0164057 A1 * | 7/2006 | Kudo et al. | ..................... | 323/282 |
| 2008/0012540 A1 * | 1/2008 | Chen | ............................. | 323/224 |
| 2008/0252274 A1 * | 10/2008 | Schindler | ....................... | 323/282 |
| 2008/0266738 A1 * | 10/2008 | Kimber | .......................... | 361/87 |
| 2008/0290854 A1 * | 11/2008 | Uchiike | ......................... | 323/284 |
| 2009/0261795 A1 * | 10/2009 | Tang et al. | ..................... | 323/283 |
| 2009/0295350 A1 * | 12/2009 | Yamada | ......................... | 323/282 |
| 2009/0302814 A1 * | 12/2009 | Kapels et al. | .................. | 323/282 |
| 2009/0302819 A1 * | 12/2009 | Lee | ................................ | 323/284 |
| 2010/0327837 A1 * | 12/2010 | Tsugawa et al. | .............. | 323/285 |
| 2011/0018515 A1 * | 1/2011 | McCloy-Stevens | .......... | 323/284 |

(Continued)

*Primary Examiner* — Timothy J Dole
*Assistant Examiner* — Yusef Ahmed
(74) *Attorney, Agent, or Firm* — Schwegman Lundberg & Weossner, P.A.

(57) ABSTRACT

A negative current protection system for a low side switching converter FET, for use with a switching converter arranged to operate high and low side FETs connected to an output inductor to produce an output voltage. The negative current protection system includes a current sensing circuit which produces an output Vcs that varies with the current in the high side FET, a negative current threshold generator which produces a threshold signal –Ith which represents the maximum negative current to which the low side FET is to be subjected, and a comparison circuit arranged to compare the valley portion of Vcs and -Ith and to set a flag if Vcs<–Ith at a predetermined time in the switching cycle—typically after the converter's blanking time. When the flag is set, the system preferably responds by adjusting the operation of the switching FETs to reduce the negative current.

20 Claims, 5 Drawing Sheets

(56) References Cited

U.S. PATENT DOCUMENTS

| | | | |
|---|---|---|---|
| 2011/0018516 A1* | 1/2011 | Notman et al. | 323/284 |
| 2011/0084678 A1* | 4/2011 | Tang et al. | 323/284 |
| 2011/0163731 A1* | 7/2011 | Qiu et al. | 323/271 |
| 2011/0234187 A1* | 9/2011 | Brown et al. | 323/282 |
| 2011/0241634 A1* | 10/2011 | Kenly et al. | 323/271 |
| 2012/0212198 A1* | 8/2012 | Nakamura et al. | 323/271 |
| 2012/0319662 A1* | 12/2012 | Kung | 323/271 |
| 2013/0207625 A1* | 8/2013 | Futamura | 323/271 |
| 2014/0015503 A1* | 1/2014 | Cheng | 323/282 |
| 2014/0028270 A1* | 1/2014 | Miyazaki | 323/271 |
| 2014/0070785 A1* | 3/2014 | Galloway | 323/285 |
| 2014/0152287 A1* | 6/2014 | Weng et al. | 323/311 |

* cited by examiner

NEGATIVE CURRENT PROTECTION SYSTEM FOR LOW SIDE SWITCHING CONVERTER FET

BACKGROUND OF THE INVENTION

1. Field of the Invention

This invention relates generally to switching converters, and more particularly to circuits for protecting the low side switching element of such a converter from excessive negative current.

2. Description of the Related Art

A typical switching power converter has high and low side switching elements which are connected to an output inductor; the switching elements are switched in complementary fashion to produce an output voltage.

Under certain conditions—for example, when the load being driven becomes light or transitions from a heavy load to a light load, or if a fault condition causes the output voltage to be higher than the nominal output voltage, or during a dynamic voltage scaling (DVS) transition from a voltage to a lower voltage (e.g., if the converter is programmed to change Vout from 3.3V to 1.5V)—the current in the output inductor can become negative. If the current becomes excessively negative, the low side switching element may be damaged. Therefore, it may be necessary to protect the low side switching element by limiting the negative current to which the switching element is subjected. The low side switching element can be, for example, a FET, BJT, diode, etc.; for simplicity, the discussion herein assumes that the low side switching element is a FET.

One way of limiting the negative current is to generate a reference voltage $V_{ref}$, and then to compare the $V_{ds}$ of the low side FET with $V_{ref}$. If the on-resistance ($R_{on}$) of the low side FET is known, a current limit for the FET can be established as $V_{ref}/R_{on}$; then comparing $V_{ds}$ to $V_{ref}$ determines whether the limit has been exceeded. However, if the $R_{on}$ of the low side FET is unknown, because the FET is selected by the end user, for example, it is not possible to establish an accurate limit for the low side FET in this way.

Another approach is described in U.S. Pat. No. 7,928,713 to Nguyen, in which the negative current is limited by forcing the low side MOSFET to operate in its saturation region; however, this may result in an unacceptably high level of power loss.

SUMMARY OF THE INVENTION

A negative current protection system for a low side switching converter FET is presented which addresses the problems discussed above.

The present negative current protection system is for use with a switching converter arranged to operate high and low side switching elements connected to an output inductor using a switching cycle having an associated 'on' time and 'off' time to produce an output voltage. The negative current protection system comprises a current sensing circuit arranged to produce an output which varies with the current in the high side switching element, a negative current threshold generator arranged to produce a threshold signal which represents the maximum negative current to which the low side switching element is to be subjected, and a comparison circuit arranged to compare the valley portion of the current sensing circuit output and the threshold signal and to set a 'maximum negative current limit exceeded' flag if the current sensing circuit output is below the threshold signal at a predetermined time in the switching cycle.

The switching cycle for many common converter topologies includes a blanking time at the beginning of each 'on' time. The comparison circuit is preferably arranged to set the 'maximum negative current limit exceeded' flag if the current sensing circuit output is below the threshold signal at the end of the blanking time. When the flag is set, the system is preferably arranged to respond by adjusting the operation of the switching elements to reduce the negative current, by turning off one or both of the switching elements, for example.

These and other features, aspects, and advantages of the present invention will become better understood with reference to the following description and claims.

BRIEF DESCRIPTION OF THE DRAWINGS

FIG. 6b is a timing diagram illustrating the operation of the digital calibration technique shown in FIG. 6a.

DETAILED DESCRIPTION OF THE INVENTION

Figure 1:
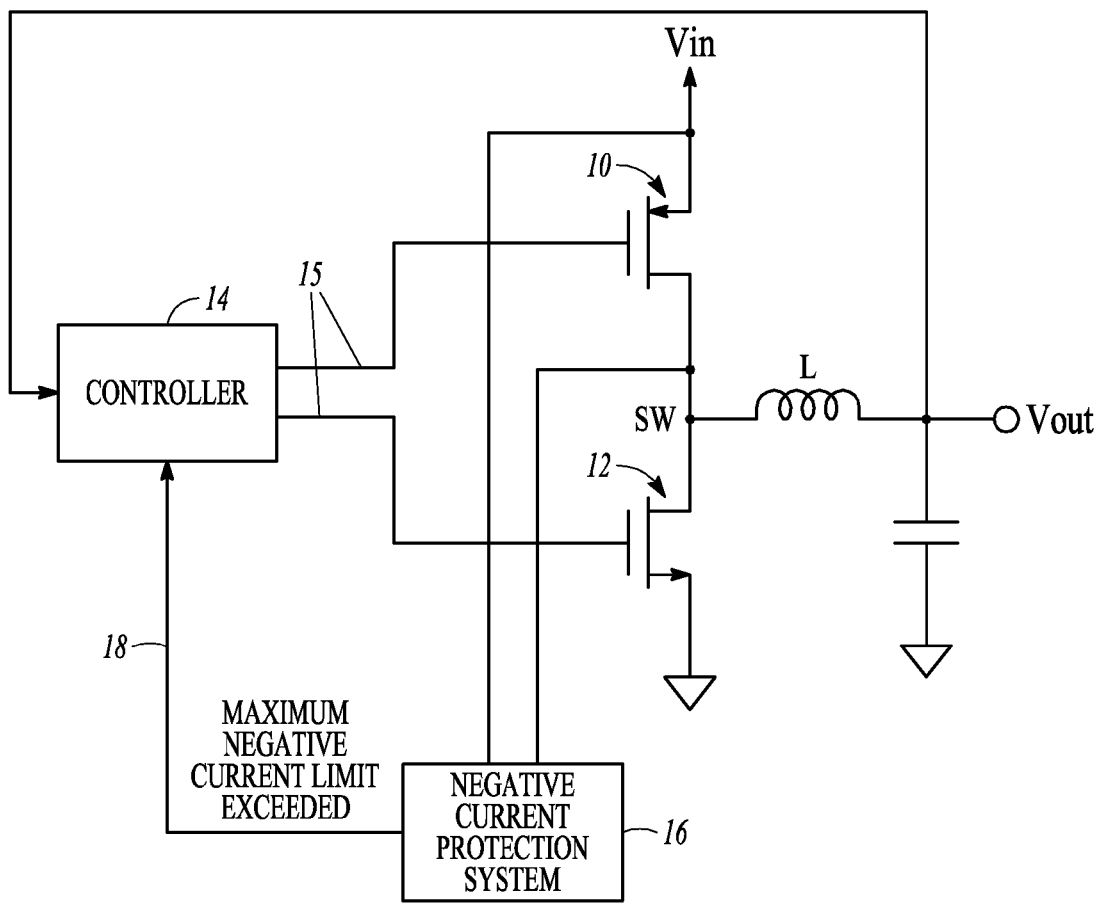
FIG. 1 is a block/schematic diagram illustrating the basic principles of the present negative current protection system.

The present negative current protection system is for use with a switching converter arranged to operate high and low side switching elements connected to an output inductor using a switching cycle having associated 'on' and 'off' times to produce an output voltage; an exemplary embodiment of such a converter is shown in FIG. 1.

As discussed above, the switching converter operates high and low switching elements 10, 12—hereinafter referred to as FETs though it is understood that other types of switching elements might also be used—which are connected to an output inductor L; the FETs are switched in complementary fashion using a switching cycle having associated 'on' and 'off' times to produce an output voltage Vout. A controller 14 typically provides the signals 15 which operate the high and low side FETs. Under certain conditions—for example, when the load being driven becomes light or transitions from a heavy load to a light load, or if a fault condition causes the output voltage to be higher than the nominal output voltage, or during a DVS transition from a voltage to a lower voltage (e.g., if the converter is programmed to change Vout from 3.3V to 1.5V)—the current in the output inductor can become negative. If the current becomes excessively negative, low side FET 12 may be damaged.

The present system prevents damage to low side FET 12 by limiting the negative current to which it can be subjected. This is accomplished with a negative current protection system 16. The negative current protection system includes a current sensing circuit which would typically be coupled across high side FET 10 (as shown), and arranged to produce an output which varies with the current in the high side FET. Negative current protection system 16 also includes a negative current threshold generator arranged to produce a first threshold signal which represents the maximum negative current to which the low side FET is to be subjected, and a comparison circuit arranged to compare the valley portion of the current sensing circuit output and the first threshold signal and to set a 'maximum negative current limit exceeded' flag 18 if the current sensing circuit output is below the first threshold signal at a predetermined time in the switching cycle.

Figure 2:
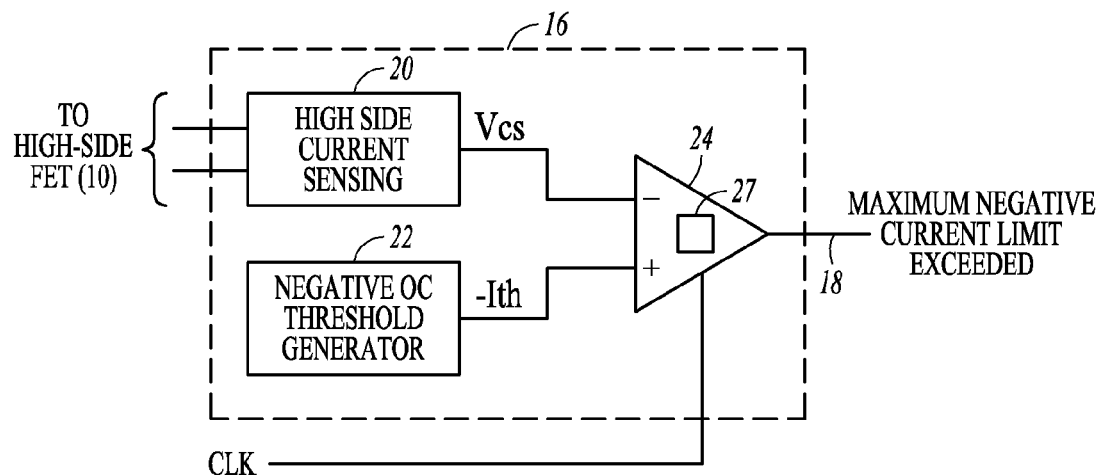
FIG. 2 is a block diagram showing the principle components of the present negative current protection system.

One possible embodiment of negative current protection system 16 is illustrated in FIG. 2. A current sensing circuit 20 is connected across high side FET 10, and produces an output voltage Vcs which varies with the current in the high side FET. A negative current threshold generator 22 provides the desired negative current threshold, here labeled as −Ith. Signals Vcs and −Ith are provided to a comparison circuit 24, typically in the form of voltages, though currents or a combination of both might also be used. Comparison circuit 24 provides the 'maximum negative current limit exceeded' flag 18 as its output, which is set if Vcs is less than −Ith at a predetermined time in the switching cycle. Here, a clock pulse CLK toggles at the predetermined time, and 'maximum negative current limit exceeded' flag 18 is set if Vcs <−Ith when CLK toggles.

Figure 3:
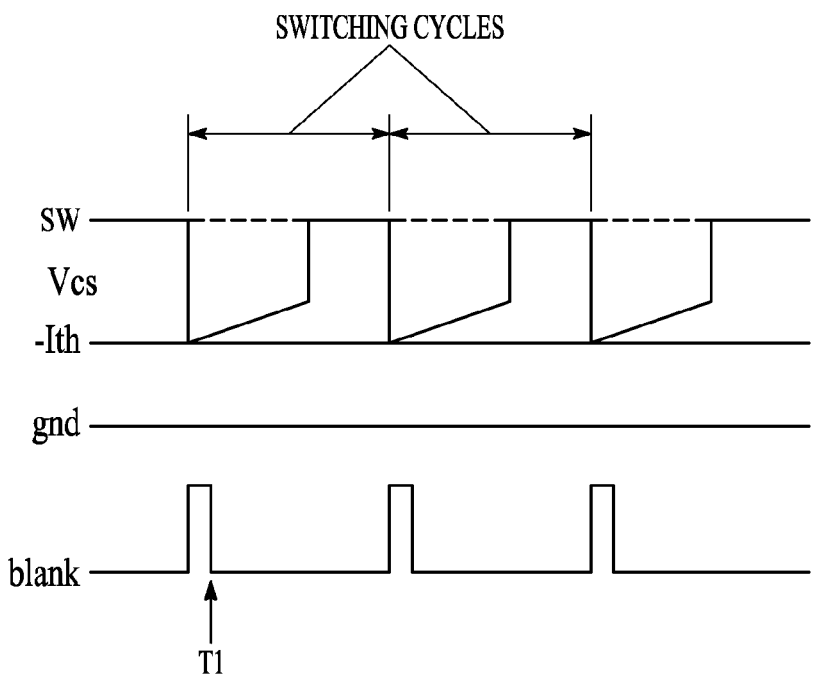
FIG. 3 is a timing diagram which illustrates one aspect of the operation of the present negative current protection system.

This timing is illustrated in the timing diagram in FIG. 3. In this example, current sense voltage Vcs indicates that low side FET 12 is being subjected to a negative current during each switching cycle. Also shown are the negative current threshold −Ith, the zero amp ('0 A') level (Vcs>0 A indicates positive inductor current, Vcs<0 A indicates negative inductor current), and ground potential 'gnd'. Note that when the inductor current goes negative, the Vcs signal should also go negative. However, generally, a switching power converter does not have a negative supply voltage available. To accommodate this, an offset is typically employed so that the 0 A level is shifted up above ground potential as shown in FIG. 3, thereby providing the headroom necessary to allow the Vcs signal to fall when the inductor current goes negative.

FIG. 3 also shows the predetermined time in the switching cycle when the 'maximum negative current limit exceeded' flag is set if Vcs<−Ith; this time is indicated as 'T1'. As noted above, the switching cycle for many common converter topologies includes a blanking time at the beginning of each 'on' time, to prevent noise that arises due to an 'off' to 'on' transition from corrupting the current sensing. This blanking time is indicated in FIG. 3 as signal 'blank'. The blanking time starts (and signal 'blank' goes high) at the start of the 'on' time, and ends (and 'blank' goes low) a short time thereafter. The end of the blanking time is indicated in FIG. 3 for the first switching cycle as time T1. If Vcs<−Ith at time T1, the 'maximum negative current limit exceeded' flag will be set.

Figure 4:
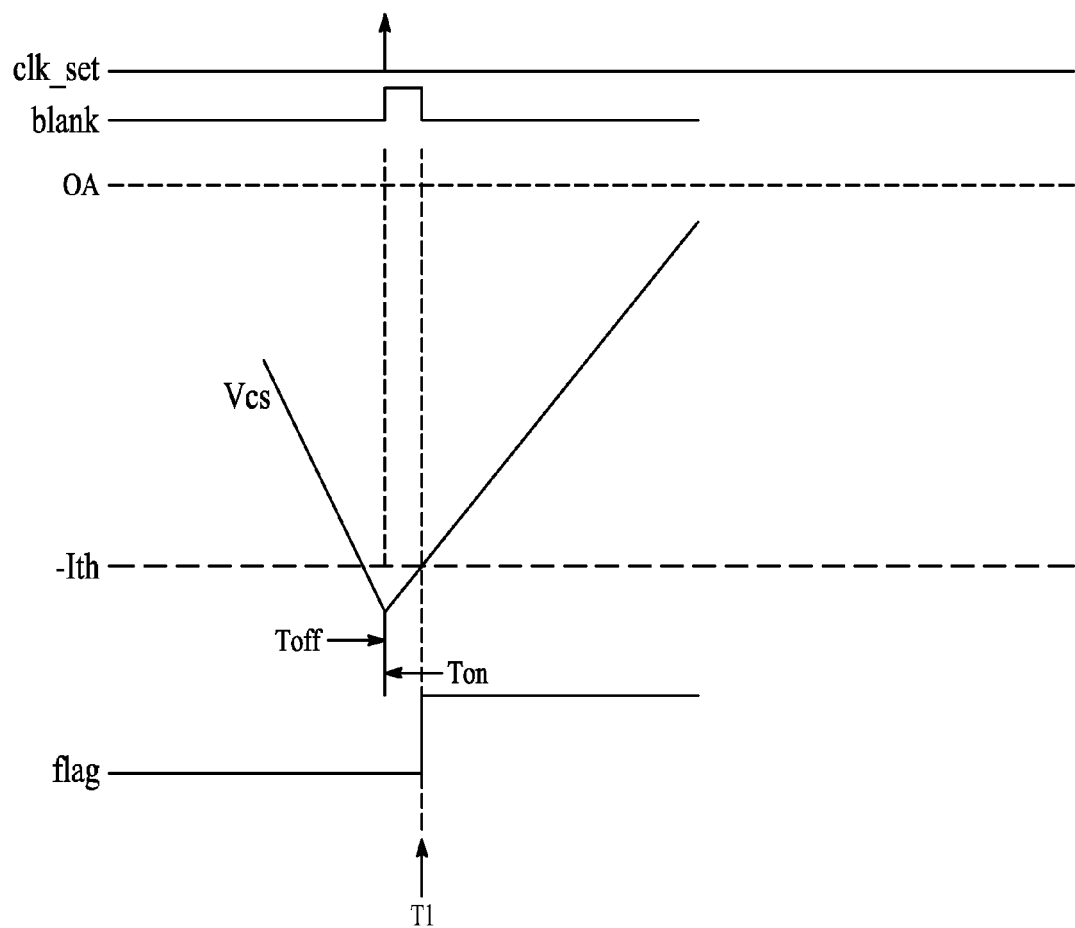
FIG. 4 is a timing diagram illustrating the conditions under which the 'maximum negative current limit exceeded' flag is set in accordance with the present invention.

The comparison step is looked at more closely in FIG. 4. The 'clk_set' signal indicates the instant when the high side FET is turned on and the 'on' time begins (labeled as time 'Ton'; label 'Toff' indicates the end of the preceding 'off' time). This also starts the blanking time, as indicated by the 'blank' signal.

Only the 'valley' portion of current sensing circuit output Vcs is shown in FIG. 4. In the example shown, near the end of the preceding 'off' time, Vcs is less than 0 A and falling, indicating a negative inductor current. Vcs reaches a minimum at time Toff, and begins to increase again at time Ton. At the end of the blanking period, at time T1, Vcs is compared with −Ith. Since Vcs is less than −Ith at time T1, the 'maximum negative current limit exceeded' flag('flag') is set.

Comparison circuit 24 preferably includes a comparator which receives current sensing circuit output Vcs and the threshold signal −Ith at respective inputs, and is arranged to toggle an output if Vcs falls below −Ith. Comparison circuit 24 also preferably includes a latch 27 which is arranged to latch the comparator output upon receipt of a clock signal. The system is arranged to provide the clock signal at the end of the blanking time in each switching cycle as described above.

Figure 5:
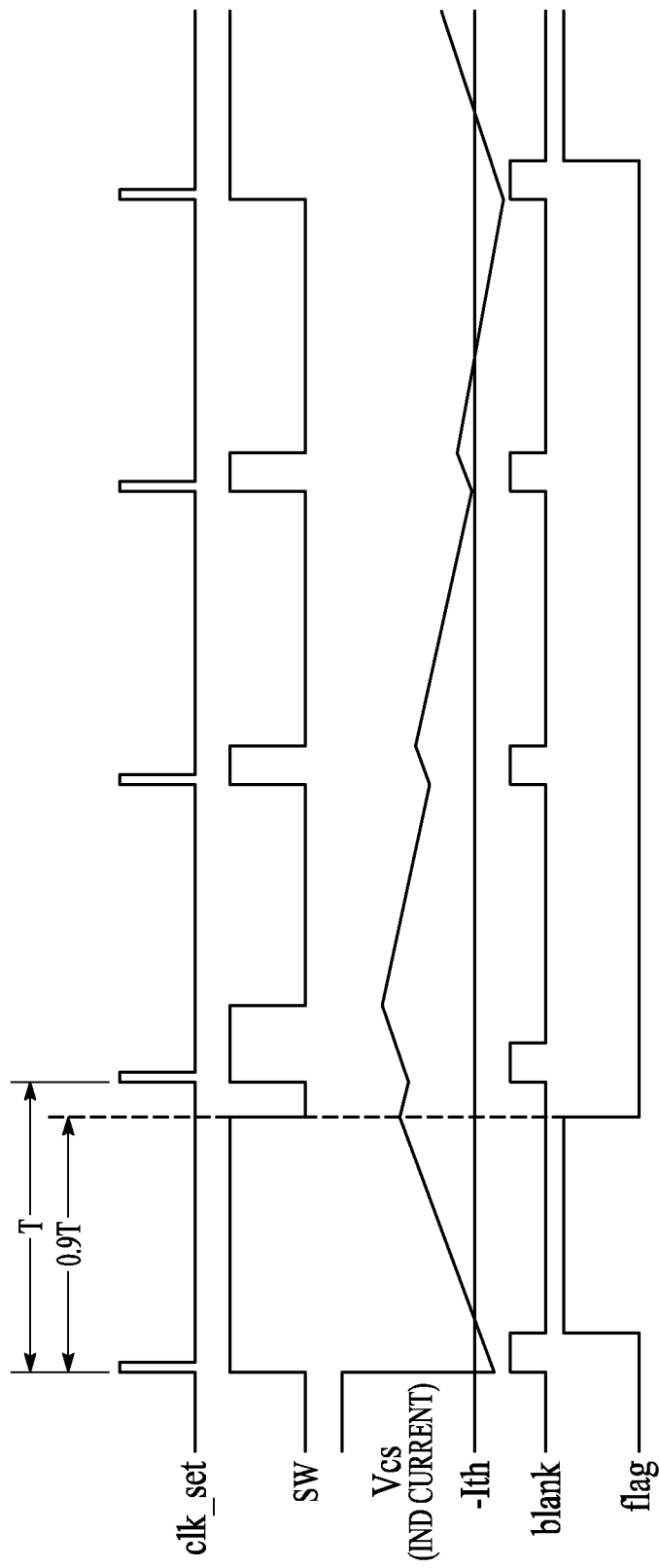
FIG. 5 is a timing diagram illustrating the operation of the present negative current protection system over time.

FIG. 5 illustrates the operation of the present negative current protection system over time. Signals clk_set, Vcs, −Ith, blank and flag are as defined above; signal SW is the signal at the junction between high and low side FETs 10 and 12. Signal SW is high when high side FET 10 is on, and low when the high side FET is off. During the first full switching cycle shown, Vcs falls below −Ith, and is still less than −Ith at the end of the blanking time. Therefore, the 'maximum negative current limit exceeded' flag ('flag') is set. The flag is reset near the end of the switching cycle, which is described in more detail below. Vcs remains above −Ith throughout the second and third switching cycles shown, but then falls below −Ith again during the fourth switching cycle. Since Vcs is still below −Ith at the end of the blanking time, the 'maximum negative current limit exceeded' flag is again set.

A mechanism is preferably provided to reset the 'maximum negative current limit exceeded' flag (if set) prior to the end of each switching cycle. One way in which this can be done is to take advantage of a 'maximum duty cycle' limit which many switching converters employ. This limit defines the maximum duty cycle that can be allowed; it is typically defined as a predetermined percentage of a switching cycle. One common value for the 'maximum duty cycle' limit is 0.9T, where T is the period of the switching cycle. The system may then be arranged such that the 'maximum negative current limit exceeded' flag, if set, is reset when the 'maximum duty cycle' limit is reached—thus, if the limit is 0.9T, the flag is reset at the 90% point of each switching cycle. Both 'T' and 0.9T are indicated in FIG. 5.

The present system is preferably arranged such that action is taken to reduce the negative current in the low side FET if the 'maximum negative current limit exceeded' flag is set. Referring back to FIG. 1, this may be accomplished by, for example, providing flag 18 to controller 14. The controller is then arranged to adjust the operation of the switching FETs as needed to reduce the negative current to which low side FET 12 is subjected when flag 18 is set. For example, controller 14 can be arranged to immediately turn off one or, preferably, both of the high and low side FETs when flag 18 is set, at least temporarily.

There are numerous means by which the negative current threshold −Ith can be generated. For example, a digital-to-analog converter (DAC) could be used to generate an analog −Ith value that corresponds to a digital value applied to the DAC's digital input.

Figure 6A:
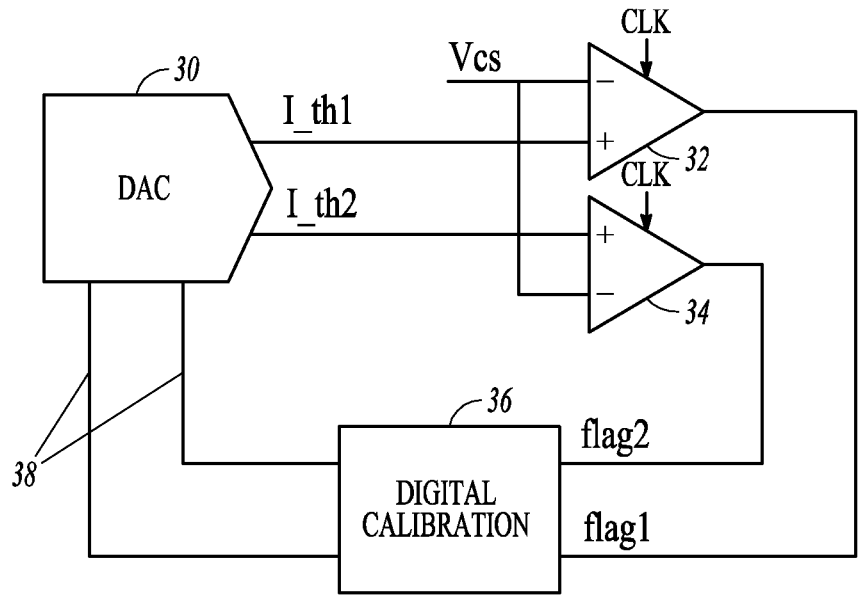
FIG. 6a is a schematic/block diagram illustrating a digital calibration technique for setting the maximum negative current threshold signal.
Figure 6B:
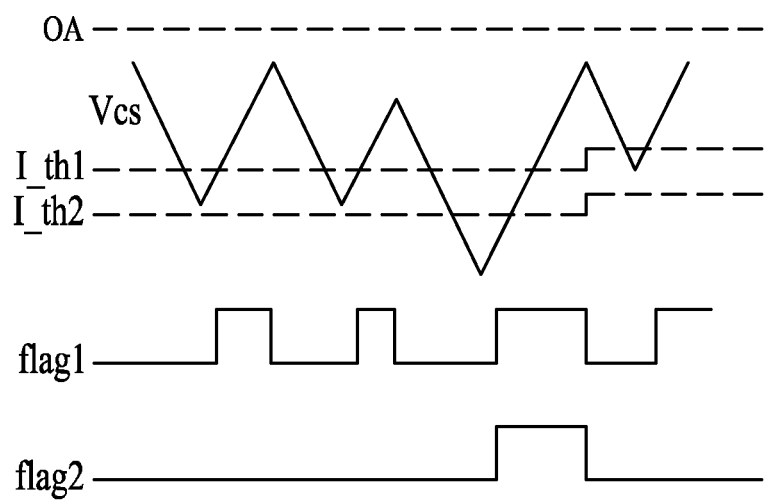

One possible method of calibrating the negative current threshold −Ith so that it is at a proper level is now described, and illustrated with the block diagram and timing diagram shown in FIGS. 6a and 6b, respectively. Here, a DAC 30 generates a first negative current threshold −Ith1, and a second negative current threshold −Ith2 which is more negative than −Ith1. The two thresholds are delivered to respective comparators 32, 34, both of which also receive current sense signal Vcs. The comparator circuits are clocked at the end of the blanking time as described above. As shown in the timing diagram of FIG. 6b, if Vcs is less than −Ith1 when the clock pulse occurs, the output of comparator 32—'flag 1'—is also pulsed. If Vcs is less than both −Ith1 and −Ith2 when the clock pulse occurs, the outputs of both comparators 32 and 34—'flag1' and 'flag2'—are pulsed.

When Vcs goes so negative that 'flag 2' is pulsed, this may be an indication that −Ith1 is set too low. The system is arranged to respond by raising thresholds −Ith1 and −Ith2. This might be accomplished with a digital calibration module 36 which receives 'flag 1' and 'flag2' and provides one or more outputs 38 to command DAC 30 to increase thresholds −Ith1 and −Ith2. Raising the thresholds in this way serves to provide greater protection against negative inductor current for low side FET 12. This calibration process continues to repeat until threshold −Ith1 is set at an appropriate level.

Note that the value of negative current threshold−Ith1 serves as the '−Ith' value described above and is the threshold used to determine whether the converter's controller should take action to reduce the negative current; threshold −Ith2 is only used as a means by which −Ith1 is adjusted. Also note that the calibration method described above is merely exemplary; there are many possible ways in which an appropriate value for the −Ith threshold could be established.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A system for protecting a low side switching element of a switching converter arranged to operate high and low side switching elements connected to an output inductor using a switching cycle having associated 'on' and 'off' times to produce an output voltage, said system comprising: a current sensing circuit arranged to produce an output which varies with the current in said high side switching element; a negative current threshold generator arranged to produce a first threshold signal which represents the maximum negative current to which said low side switching element is to be subjected; and a comparison circuit arranged to compare the valley portion of said current sensing circuit output and said first threshold signal and to set a 'maximum negative current limit exceeded' flag if said current sensing circuit output is below said first threshold signal at a predetermined time in said switching cycle; wherein said switching cycle includes a blanking time at the beginning of each 'on' time, said comparison circuit arranged to set said 'maximum negative current limit exceeded' flag if said current sensing circuit output is below said first threshold signal at the end of said blanking time, and wherein a 'maximum duty cycle' limit is a predetermined percentage of said switching cycle and the 'maximum negative current limit exceeded' flag is reset when the 'maximum duty cycle' limit is reached during said switching cycle.

2. The system of claim 1, wherein said comparison circuit comprises: a comparator which receives said current sensing circuit output and said first threshold signal at respective inputs and is arranged to toggle an output if said current sensing circuit output falls below said first threshold signal; and a latch arranged to latch said comparator output upon receipt of a clock signal; said system arranged to provide said clock signal at the end of the blanking time in each of said switching cycles.

3. The system of claim 1, wherein said switching converter includes a controller arranged to operate said switching elements, said controller arranged to receive said 'maximum negative current limit exceeded' flag and to adjust the operation of said switching elements to reduce the negative current to which said low side switching element is subjected when said flag is set.

4. The system of claim 3, wherein said controller is arranged to turn off one or both of said high and low side switching elements when said flag is set.

5. The system of claim 4, wherein said controller is arranged to operate both the high side and low side switching elements when said 'maximum negative current limit exceeded' flag, if set, is reset when said 'maximum duty cycle' limit is reached during the switching cycle.

6. The system of claim 1, wherein said negative current threshold generator comprises a digital-to-analog converter (DAC) circuit which generates said first threshold signal.

7. The system of claim 6, wherein said DAC circuit is further arranged to generate a second threshold signal having a value which is more negative than said first threshold value, further comprising a comparison circuit arranged to compare the valley portion of said current sensing circuit output with both of said first and second threshold signals, said system arranged to command said DAC circuit to adjust said first and second threshold signals to less negative values if both of said first and second threshold signals are exceeded.

8. The system of claim 1, wherein said switching converter includes a controller arranged to turn off the low side switching element when the 'maximum negative current limit exceeded' flag is set and operate the low side switching element when the maximum negative current limit exceeded' flag is reset.

9. The system of claim 1, wherein said switching converter includes a controller arranged to turn off said high side switching element when said 'maximum negative current limit exceeded' flag is set and operate said high side switching element when said 'maximum negative current limit exceeded' flag is reset when said 'maximum duty cycle' limit is reached during a switching cycle.

10. The system of claim 1, wherein said switching converter includes a controller arranged to turn off both said high side and low side switching elements when said 'maximum negative current limit exceeded' flag is set and operate said high side and low side switching elements when said 'maximum negative current limit exceeded' flag is reset when said 'maximum duty cycle' limit is reached during a switching cycle.

11. The system of claim 1, wherein said low side switching element includes a field effect transistor (FET).

12. A method of limiting a negative current to which a low side switching element of a switching converter is subjected, said switching converter arranged to operate high and low side switching elements connected to an output inductor using a switching cycle having associated 'on' and 'off' times to produce an output voltage and including a blanking time at the beginning of each 'on' time, said method comprising: sensing the current in said high side switching element; generating a first threshold signal which represents the maximum negative current to which said low side switching element is to be subjected; comparing the valley portion of said sensed current and said first threshold signal; setting a 'maximum negative current limit exceeded' flag if said sensed current is below said first threshold signal at an end of said blanking time in said switching cycle; and resetting said 'maximum negative current limit exceeded' flag when a 'maximum duty cycle' limit is reached during said switching cycle, wherein said 'maximum duty cycle' limit is a predetermined percentage of said switching cycle.

13. The method of claim 12, further comprising adjusting the operation of said switching elements to reduce the negative current to which said low side switching element is subjected when said flag is set.

14. The method of claim 13, wherein said adjusting comprises turning off one or both of said high and low side switching elements when said flag is set.

15. The method of claim 14, said method further comprising operating both the high side and low side switching elements when said 'maximum negative current limit exceeded' flag, if set, is reset when said 'maximum duty cycle' limit is reached.

16. The method of claim 12, further comprising: generating a second threshold signal having a value which is more negative than said first threshold value; comparing the valley portion of said sensed current with said second threshold signal; and adjusting said first and second threshold signals to less negative values if both of said first and second threshold signals are exceeded.

17. The method of claim 12, including turning off the low side switching element when the 'maximum negative current limit exceeded' flag is set and operating the low side switching element when the maximum negative current limit exceeded' flag is reset.

18. The method of claim 12, including turning off said high side switching element when said 'maximum negative current limit exceeded' flag is set and operating said high side switching element when said 'maximum negative current limit exceeded' flag is reset when said 'maximum duty cycle' limit is reached during a switching cycle.

19. The method of claim 12, including turning off both said high side and low side switching elements when said 'maximum negative current limit exceeded' flag is set and operating said high side and low side switching elements when said 'maximum negative current limit exceeded' flag is reset when said 'maximum duty cycle' limit is reached during a switching cycle.

20. The method of claim 12, wherein said 'maximum duty cycle' limit is ninety percent (90%) of said switching cycle.

* * * * *